(12) United States Patent
Wolpert

(10) Patent No.: US 10,833,348 B2
(45) Date of Patent: Nov. 10, 2020

(54) SUBUNIT OF A BATTERY MODULE, BATTERY MODULE COMPRISING SUCH A SUBUNIT AND METHOD FOR PRODUCING SAME

(71) Applicant: Robert Bosch GmbH, Stuttgart (DE)

(72) Inventor: Andreas Wolpert, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 15/955,363

(22) Filed: Apr. 17, 2018

(65) Prior Publication Data
US 2018/0309154 A1 Oct. 25, 2018

(30) Foreign Application Priority Data
Apr. 19, 2017 (DE) .................. 10 2017 206 564

(51) Int. Cl.
| | | |
|---|---|---|
| H01M 10/04 | (2006.01) | |
| H01M 2/02 | (2006.01) | |
| H01M 10/613 | (2014.01) | |
| H01M 2/10 | (2006.01) | |
| H01M 10/6557 | (2014.01) | |

(52) U.S. Cl.
CPC ..... *H01M 10/0422* (2013.01); *H01M 2/0277* (2013.01); *H01M 2/1077* (2013.01); *H01M 10/613* (2015.04); *H01M 10/6557* (2015.04)

(58) Field of Classification Search
CPC combination set(s) only.
See application file for complete search history.

(56) References Cited

U.S. PATENT DOCUMENTS

| | | | | |
|---|---|---|---|---|
| 2010/0151309 | A1* | 6/2010 | Marukawa | H01M 10/615 429/120 |
| 2014/0272508 | A1* | 9/2014 | Musetti | H01M 2/1077 429/99 |
| 2015/0295288 | A1 | 10/2015 | Brandstaetter et al. | |
| 2016/0028131 | A1* | 1/2016 | Lee | H01M 10/647 429/120 |
| 2016/0036105 | A1* | 2/2016 | Toshioka | H01M 10/6557 429/120 |

(Continued)

FOREIGN PATENT DOCUMENTS

| | | |
|---|---|---|
| CN | 106758196 A | 5/2017 |
| DE | 10352046 | 6/2005 |
| DE | 102007001590 | 7/2008 |

(Continued)

OTHER PUBLICATIONS

Wartenberg. DE 102014200983 English translation. Jul. 23, 2015. (Year: 2015).*

*Primary Examiner* — Christopher P Domone
(74) *Attorney, Agent, or Firm* — Michael Best & Friedrich LLP

(57) ABSTRACT

A subunit of a battery module (2), comprising a first receiving element (3) and a second receiving element (4) which are connected to each other, forming at least one first receiving space (7) and at least one second receiving space (8), wherein the first receiving space (7) and the second receiving space (8) are separated from each other, and at least one battery cell stack (5) or at least one battery cell (6) is arranged in the first receiving space (7), and the second receiving space (8) is configured for receiving a temperature-control fluid (9).

21 Claims, 5 Drawing Sheets

(56) References Cited

U.S. PATENT DOCUMENTS

2016/0164061 A1\* 6/2016 Han .................. H01M 2/18
429/120

FOREIGN PATENT DOCUMENTS

| DE | 102014200983 A1 | 7/2015 |
|----|-----------------|--------|
| EP | 2930782 | 10/2015 |
| KR | 20160128019 A | 11/2016 |
| WO | 2017065762 A1 | 4/2017 |

\* cited by examiner

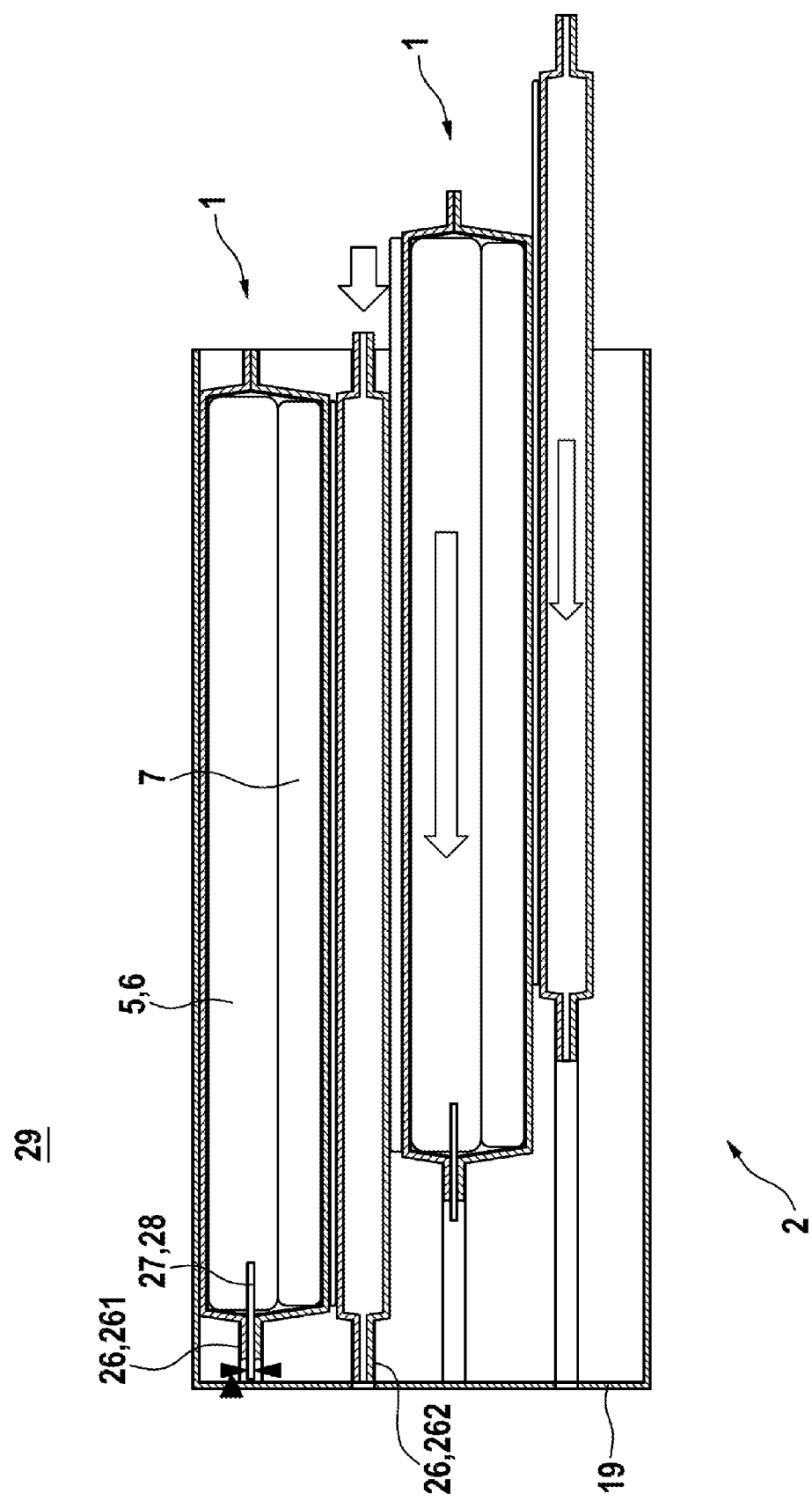

SUBUNIT OF A BATTERY MODULE, BATTERY MODULE COMPRISING SUCH A SUBUNIT AND METHOD FOR PRODUCING SAME

BACKGROUND OF THE INVENTION

The invention is based on a subunit of a battery module. Furthermore, the invention also relates to a battery module comprising such a subunit. The subject matter of the present invention is also a method for producing such a subunit of a battery module.

Document DE 103 52 046 A1 discloses a cooling device for a battery, wherein the battery cells are arranged in cylindrical receptacles through which an, in particular, liquid fluid can flow.

Document DE 10 2007 001 590 A1 discloses a battery module comprising a plurality of battery cells which are arranged one above another in the manner of a stack and wherein a cooling plate is arranged between each two battery cells. The cooling plate here has a plurality of ducts through which a flow can pass, for removing heat, wherein the cooling plates can preferably be designed as sheet-metal shaped parts having a plurality of fins.

Document EP 2 930 782 A1 discloses a cooling device for cooling an electric component of a battery system, wherein the cooling device has a cooler upper part and a cooler lower part, and wherein at least one cooling duct through which a cooling medium can flow is formed between upper part and lower part.

SUMMARY OF THE INVENTION

A subunit of a battery module according to the invention has the advantage that a receptacle of a battery cell stack or a battery cell having reliable cooling can be formed in a simple manner.

For this purpose, a subunit of a battery module is provided. The subunit of the battery module has a first receiving element and a second receiving element here The first receiving element and the second receiving element are connected to each other here, forming at least one first receiving space and at least one second receiving space.

Furthermore, the first receiving space and the second receiving space are separated from each other.

At least one battery cell stack or at least one battery cell is arranged in the first receiving space here.

The second receiving space is designed here for receiving a temperature-control fluid.

It should be noted in this regard at this juncture that a subunit of a battery module is intended to be understood as meaning in particular that a battery module can preferably be constructed from a plurality of such subunits.

Advantageous developments and improvements of the device specified are possible by means of the measures cited in the dependent claims.

It is expedient if a compensating element is furthermore arranged in the first receiving space.

The compensating element is designed here to be elastically and/or plastically deformable.

As a result, it is possible for the compensating element to be able to compensate for changes in volume, which are referred to as protuberance, of the at least one battery cell stack or the at least one battery cell or can also oppose same.

It is of advantage if the first receiving element and the second receiving element are connected to each other in an integrally bonded manner.

Such an integrally bonded connection can be formed, for example, in a welded manner, preferably in a laser-welded manner.

It is thereby possible to reliably connect the first receiving element and the second receiving element to each other, as a result of which overall a reliable formation of a first receiving space for receiving at least one battery cell stack or at least one battery cell can be formed, wherein the first receiving space is separated here in particular by the integrally bonded connection from the second receiving space which is designed for receiving a temperature-control fluid.

It is therefore possible in a reliable manner to prevent contact between the temperature-control fluid and the at least one battery cell stack or the at least one battery cell.

According to an advantageous aspect of the invention, the first receiving space furthermore has an insulating element which is designed to be electrically insulating.

The insulating element here at least partially surrounds the at least one battery cell stack or the at least one battery cell.

Furthermore, it is, however, also possible for the insulating element to completely surround the at least one battery cell stack or the at least one battery cell, wherein, in such a case, the insulating element preferably also has leadthroughs for the voltage taps, in particular the positive voltage tap and the negative voltage tap, of the at least one battery cell stack or the at least one battery cell.

It is therefore possible to prevent an electric contact connection between the at least one battery cell stack or the at least one battery cell and the first receiving element and the second receiving element of the subunit of the battery module, as a result of which the safety of the battery module, for example, can be increased.

The subunit of the battery module preferably comprises a plurality of first receiving spaces and a plurality of second receiving spaces.

In each case one battery cell stack or at least one battery cell is arranged here in the first receiving spaces.

The second receiving spaces here are each designed for receiving a temperature-control fluid.

It is thereby possible to combine a plurality of battery cell stacks or a plurality of battery cells to form a subunit of a battery module.

It is expedient here if the first receiving spaces and the second receiving spaces are arranged in an alternating manner in a longitudinal direction of the subunit.

Therefore, in a longitudinal direction, a second receiving space follows a first receiving space here, and a first receiving space follows a second receiving space.

Such a design provides the advantage of a compact construction when a battery module is formed from a plurality of such subunits.

Furthermore, the invention also relates to a battery module which has a plurality of subunits according to the invention.

It is expedient here if the battery module has a first subunit and a second subunit.

A first first section of the first receiving element is arranged directly adjacent here to a second second section of the second receiving element.

The first first section of the first receiving element here bounds a first receiving space of the first subunit.

The second second section of the second receiving element here bounds a second receiving space of the second subunit.

Furthermore, a second first section of the second receiving element is arranged directly adjacent here to a first second section of the first receiving element.

The second first section of the second receiving element here bounds a first receiving space of the second subunit.

The first second section of the first receiving element here bounds a second receiving space of the first subunit.

This makes it possible to provide a battery module comprising at least two subunits, which is simply constructed and in which the battery cell stacks of the battery module or the battery cells of the battery module can be reliably cooled.

It should also be noted at this juncture that the first subunit or the second subunit can, of course, be developed with each of the advantageous developments described in conjunction with the subunit according to the invention of the battery module.

It is also of advantage if a compensating element which is designed to be elastically and/or plastically deformable is arranged between the first first section and the second second section and/or between the second first section and the first second section.

In particular, the compensating element here is additionally designed to be heat-conducting or comprises additives for increasing the heat conductivity, as a result of which a reliable transfer of heat can be formed between a temperature-control fluid accommodated in a second receiving space and a battery cell stack accommodated in a first receiving space or a battery cell accommodated in a first receiving space.

According to an advantageous aspect of the invention, the battery module is accommodated in a housing, wherein the housing comprises a first connection for admitting temperature-control fluid into at least one second receiving space, and a second connection designed for letting temperature-control fluid out of at least one second receiving space. Reliable cooling of the battery module can thus be provided.

In particular, the battery module is accommodated in a housing, wherein a control and/or regulating device and/or an electric connecting line are/is arranged between a second receiving space of a subunit of the battery module and a housing wall of the battery module. This makes it possible to provide a compact construction of a battery module which can also comprise a control and/or regulating device and/or an electric connecting line.

The subject matter of the present invention is also a method for producing a subunit of a battery module.

In this case, in a first method step, a first receiving element and a second receiving element are provided.

In a second method step, at least one battery cell stack or at least one battery cell is arranged between the first receiving element and the second receiving element.

Furthermore, in a third method step, the first receiving element and the second receiving element are connected to each other in such a manner that a first receiving space is formed, in which the at least one battery cell stack or the at least one battery cell is accommodated.

Furthermore, in the third method step, the first receiving element and the second receiving element are connected to each other in such a manner that a second receiving space is formed, which is designed for receiving a temperature-control fluid.

The first receiving space and the second receiving space are separated from each other here.

A battery module according to the invention can be used for batteries in electric vehicles, a hybrid vehicle and plug-in hybrid vehicles, and in mobile entertainment and communication devices and also in stationary accumulators.

BRIEF DESCRIPTION OF THE DRAWINGS

Exemplary embodiments of the invention are illustrated in the drawings and are explained in more detail in the description below.

In the drawings.

DETAILED DESCRIPTION

Figure 1:
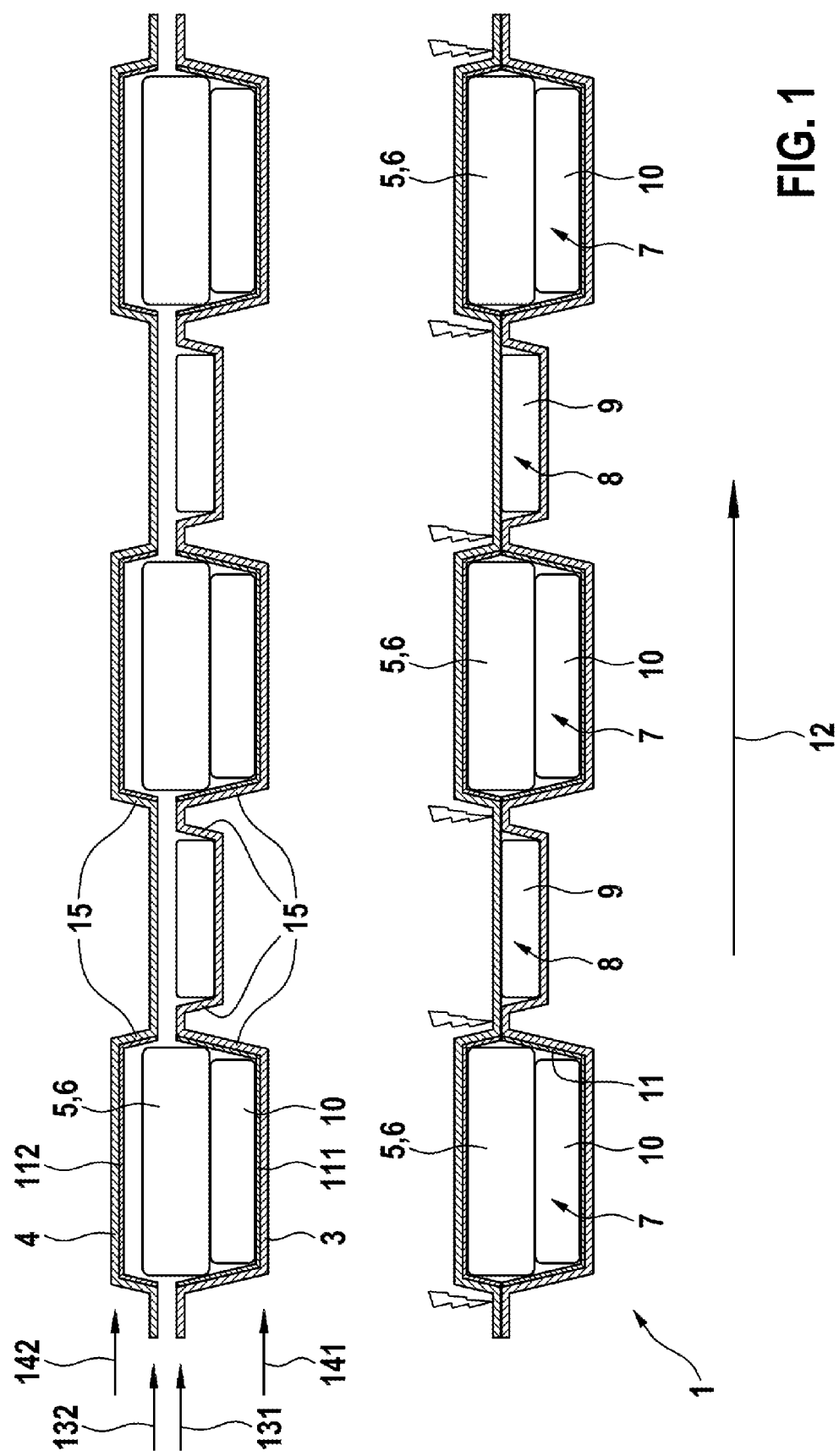
FIG. 1 schematically shows a method according to the invention for producing a subunit according to the invention of a battery module, FIG. 2 schematically shows a battery module according to the invention with subunits according to the invention in a side view, FIG. 3 schematically shows a battery module according to the invention in a top view, FIG. 4 schematically shows a further embodiment of a battery module according to the invention in a side view, and FIG. 5 schematically shows in a side view a method for producing a battery module according to the invention.

FIG. 1 schematically shows a method according to the invention for producing a subunit 1 according to the invention of a battery module 2.

In this case, in a first method step, a first receiving element 3 and a second receiving element 4 are provided. In a second method step, a battery cell stack 5 or a battery cell 6 is arranged between the first receiving element 3 and the second receiving element 4.

The upper illustration of FIG. 1 in particular shows here a state of the method according to the invention after the second method step has been carried out.

In a third method step, the first receiving element 3 and the second receiving element 4 are connected to each other.

The first receiving element 3 and the second receiving element 4 are connected to each other here in such a manner that a first receiving space 7 and a second receiving space 8 are formed.

The battery cell stack 5 or the battery cell 6 is accommodated here in the first receiving space 7.

Furthermore, the second receiving space 8 is designed for receiving a temperature-control fluid 9.

The lower illustration of FIG. 1 in particular shows here a state of the method according to the invention during the carrying out of the third method step.

A method according to the invention therefore makes it possible to provide a subunit 1 of a battery module 2, which subunit has a first receiving element 3 and a second receiving element 4, wherein the first receiving element 3 and the second receiving element 4 are connected to each other, forming a first receiving space 7 and a second receiving space 8.

At least one battery cell stack 5 or at least one battery cell 6 is arranged here in the first receiving space 7.

Furthermore, the second receiving space 8 is designed for receiving a temperature-control fluid 9.

Furthermore, it can be seen from FIG. 1 that a compensating element 10 is furthermore arranged in the first receiving space 7.

The compensating element 10 here is designed to be elastically and/or plastically deformable.

The first receiving element 3 and the second receiving element 4 are connected to each other here in an integrally bonded manner, wherein, according to the lower illustration of FIG. 1, the first receiving element 3 and the second receiving element 4 are connected to each other in a welded manner.

Furthermore, the first receiving space 7 of the subunit 1 comprises an insulating element 11 which is designed to be electrically insulating.

According to the embodiment of the subunit 1 that is illustrated in FIG. 1, the insulating element 11 comprises a first insulating element 111 and a second insulating element 112.

The first insulating element 111 is arranged here on the first receiving space 3; in particular, the first insulating element 111 covers those regions of the first receiving element 3 which bound the first receiving space 7.

The second insulating element 112 is arranged here on the second receiving element 4; in particular, the second insulating element 112 covers those regions of the second receiving element 4 which bound the first receiving space 7.

The insulating element 11 here at least partially surrounds the battery cell stack 5 or the battery cell 6.

In particular, the first insulating element 111 and the second insulating element 112 at least partially surround the battery cell stack 5 or the battery cell 6.

A partial surrounding is intended to be understood as meaning in particular that the battery cell stack 5 or the battery cell 6 is electrically insulated in relation to the first receiving element 3 and the second receiving element 4.

If the first receiving element 3 and the second receiving element 4 are connected to each other, the first insulating element 111 and the second insulating element 112 together insulate the first receiving space 7 in relation to the receiving element 3 and the second receiving element 4, and in particular also in relation to the second receiving space 8, in which a temperature-control fluid 9 can flow.

Furthermore, FIG. 1 also shows that the subunit 1 has a plurality of first receiving spaces 7 and a plurality of second receiving spaces 8. The first receiving spaces 7 are each designed here for receiving a battery cell stack 5 or a battery cell 6, wherein the first receiving spaces 7 can furthermore each also have a compensating element 10 and an insulating element 11.

The second receiving spaces 8 are each designed here for receiving a temperature-control fluid 9.

As can be seen from FIG. 1, the first receiving spaces 7 and the second receiving spaces 8 are arranged in an alternating manner in a longitudinal direction 12 of the subunit 1.

At this juncture, the design of the first receiving element 3 and of the second receiving element 4 should also be discussed.

The first receiving element 3 and the second receiving element 4 preferably respectively have a first base plane 131 and a second base plane 132.

Furthermore, the first receiving element 3 and the second receiving element 4 respectively have a first further plane 141 and a further second further plane 142.

The first base plane 131 and the first further plane 141, and the second base plane 132 and the second further plane 142 are preferably arranged parallel to one another here and are spaced apart from one another.

In particular, the first base plane 131 and the first further plane 141 and the second base plane 132 and the second further plane 142 are spaced apart from one another here in regions which are designed for forming the first receiving space 7 and also the second receiving space 8.

The first receiving element 3 and the second receiving element 4 here in each case comprise connecting regions 15 which connect sections of the first base plane 131 and of the first further plane 141 to one another or which connect sections of the second base plane 132 and of the further second plane 142 to one another.

In particular, it is possible here to design the first receiving element 3 and the second receiving element 4 as a punched part.

Figure 2:
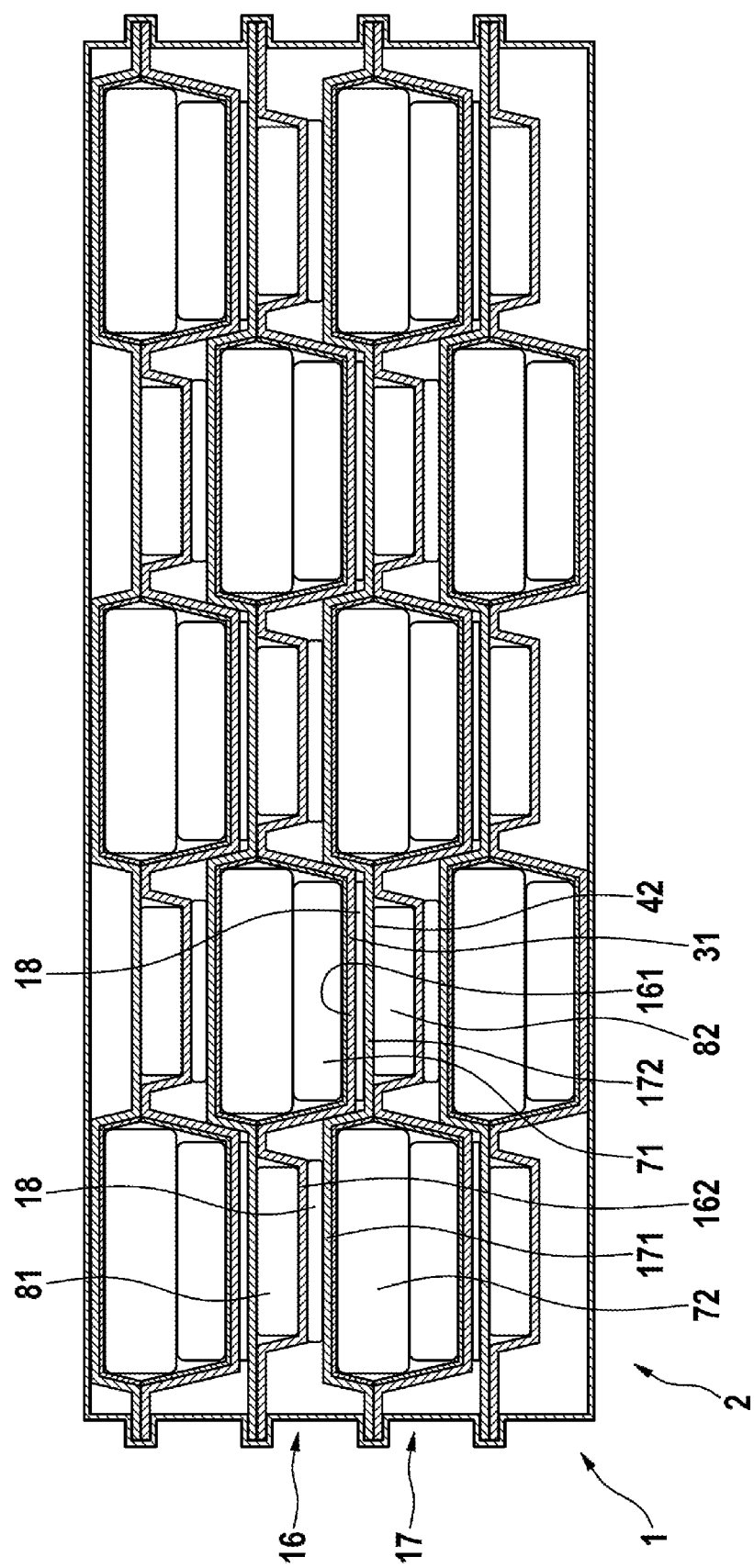

FIG. 2 schematically shows a battery module 2 according to the invention with a plurality of subunits 1 according to the invention. In particular, the battery module 2 shown in FIG. 2 has four subunits 1.

The battery module 2 here in particular has a first subunit 16 and a second subunit 17.

The first receiving element 31 of the first subunit 16 here has a first first section 161 which bounds a first receiving space 71 of the first subunit 16.

The second receiving element 42 of the second subunit 17 here has a second second section 172 which bounds a second receiving space 82 of the second subunit 17.

As can be seen here from FIG. 2, the first first section 161 and the second second section 172 are arranged directly adjacent to each other.

The second receiving element 42 of the second subunit 17 here has a second first section 171 which bounds a first receiving space 72 of the second subunit 17.

The first receiving element 31 of the first subunit 16 here has a first second section 162 which bounds a second receiving space 81 of the first subunit 16.

As can be seen here from FIG. 2, the second first section 171 and the first second section 162 are arranged directly adjacent to each other.

Furthermore, a compensating element 18 which is designed to be elastically and/or plastically deformable can be arranged between the first first section 161 and the second second section 172.

Furthermore, a compensating element 18 which is designed to be elastically and/or plastically deformable can be arranged between the second first section 171 and the first second section 162.

The compensating element 18 here can additionally also be designed with increased heat conductivity or can comprise additives for increasing the heat conductivity, and therefore the transfer of heat between a temperature-control fluid 9 flowing within the second receiving space 8 and a battery cell stack 5 accommodated within the first receiving space 7, or a battery cell 6 accommodated within the first receiving space 7 can be increased.

Figure 3:
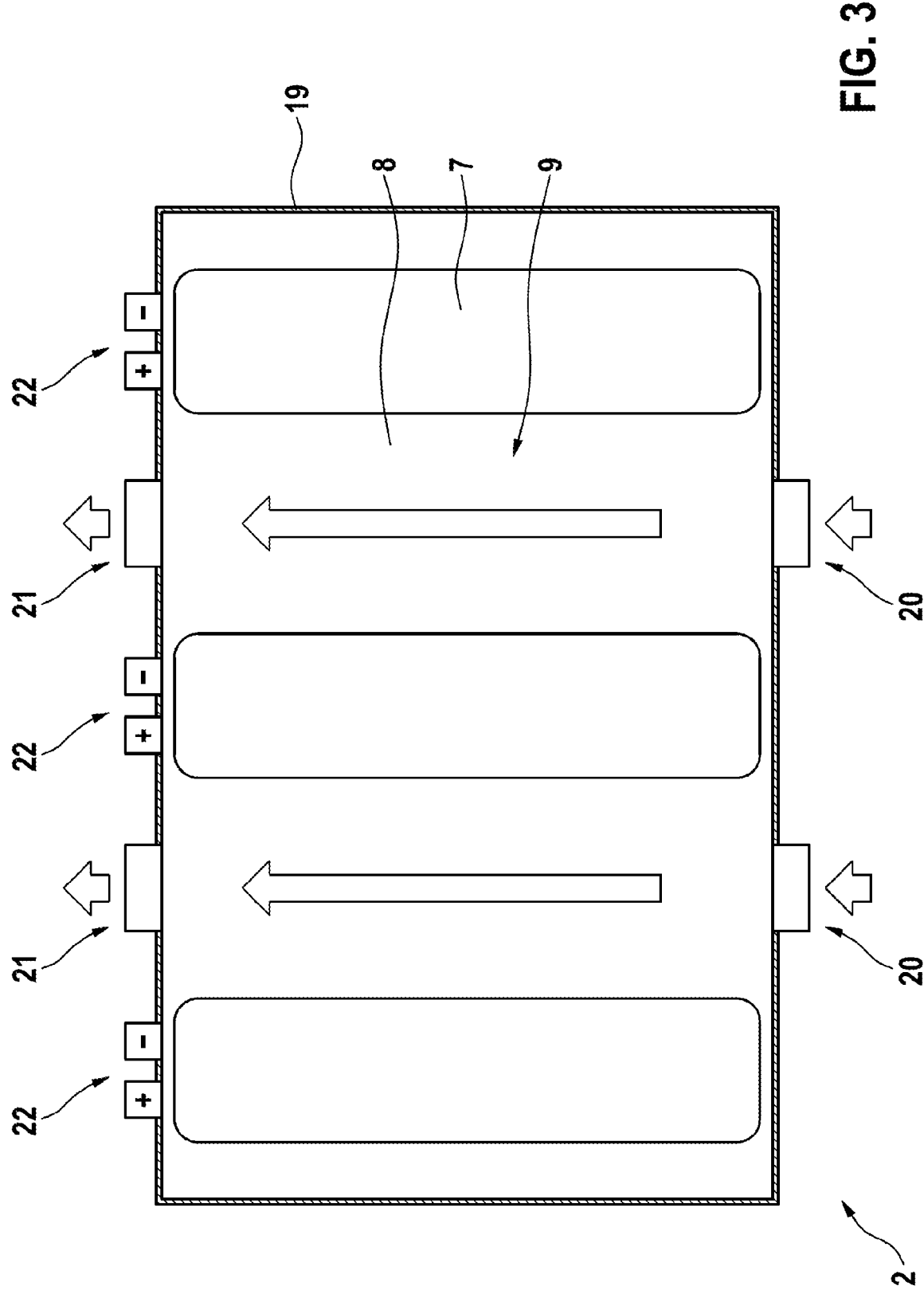

FIG. 3 shows schematically in a top view a battery module 2 according to the invention. In particular, FIG. 3 shows a section through a subunit 1 of the battery module 2, wherein the sectional view shown is parallel to the first base plane 131 and to the second base plane 132. First receiving spaces 7 and second receiving spaces 8 can be seen schematically here.

The battery module 2 is accommodated here in a housing 19.

The housing 19 of the battery module 2 here comprises a first connection 20 which is designed for admitting temperature-control fluid 9 into a second receiving space 8.

The housing 19 of the battery module 2 here comprises a second connection 21 which is designed for letting temperature-control fluid 9 out of the second receiving space 8.

Furthermore, FIG. 3 shows that the battery module 2 comprises voltage taps 22 which are guided out of the housing 19 of the battery module 2.

Figure 4:
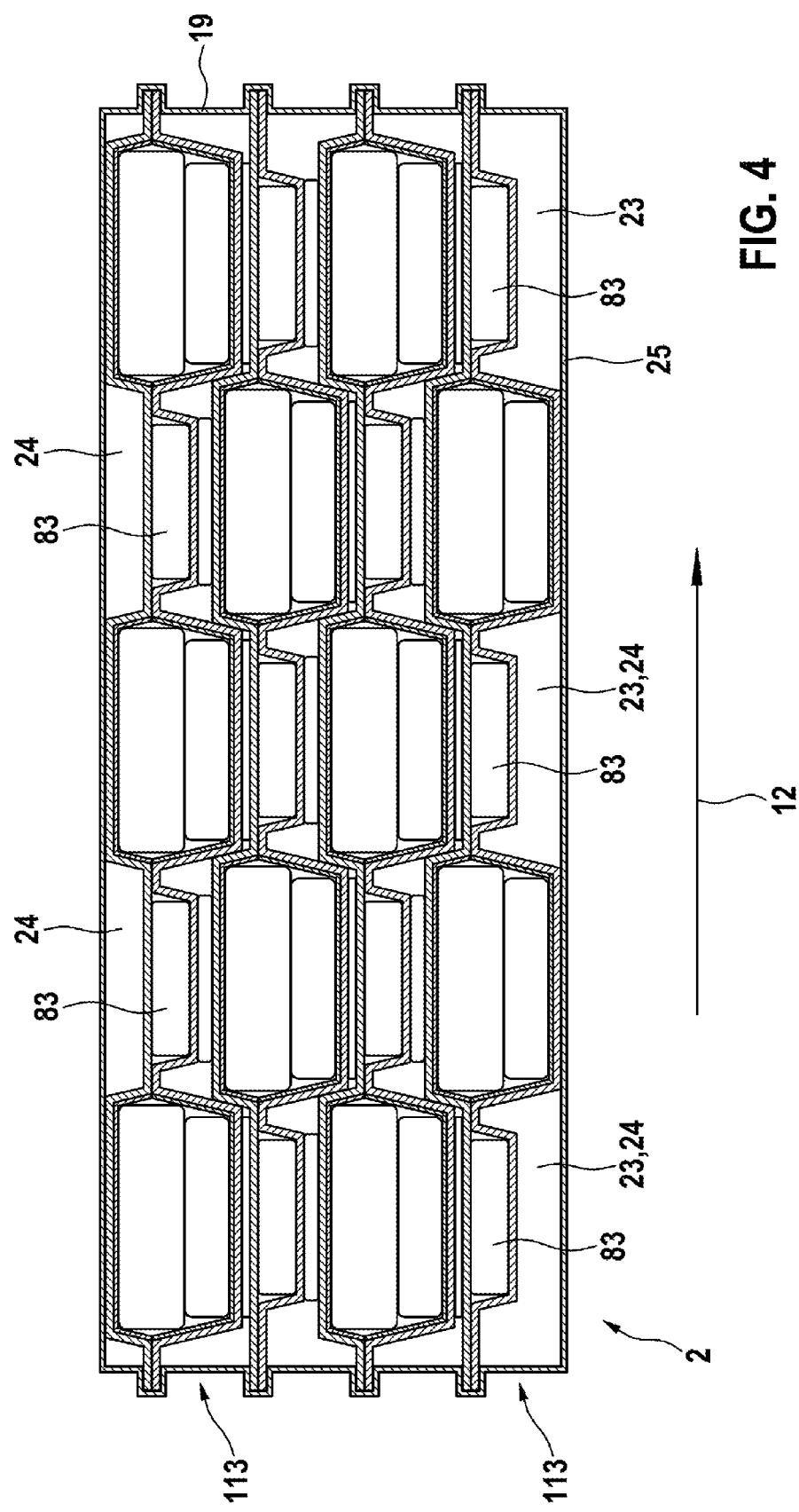

FIG. 4 schematically shows in a side view a further embodiment of a battery module 2 according to the invention.

The further embodiment of the battery module 2 that is shown in FIG. 4 differs here from the embodiment of the battery module 2 that is shown in FIG. 2 in that the battery module 2 furthermore comprises a control and/or regulating device 23 and electric connecting lines 24.

The battery module 2 according to FIG. 4 also comprises a plurality of subunits 1. In particular, the battery module 2 here comprises two subunits 113 which are arranged at the end and are therefore arranged in the longitudinal direction 12 of the respective subunit 1 adjacent to a housing wall 25 of the battery module 2 over the entire respective longitudinal direction 12.

The control and/or regulating device 23 and the electric connecting lines 24 are in each case arranged here between the housing wall 25 and a second receiving space 83 of the end subunits 113.

In particular by means of the design of the first receiving spaces 7 and the second receiving spaces 8 in such a manner that, in the case of the first receiving spaces 7, the largest distance between the first receiving element 3 and the second receiving element 4 is greater than the largest distance between the first receiving element 3 and the second receiving element 4, in the case of the second receiving spaces 8, the control and/or regulating device 23 and the electric lines 24 can be arranged between the housing wall 25 and the second receiving space 83 of the respective end subunits 113.

FIG. 5 schematically shows a method for producing a battery module 2 with subunits 1 according to the invention in a side view.

It should be noted in this regard that the view of FIG. 5 is rotated by 90° in comparison to the views of FIGS. 2 and 4.

In particular, the right side, illustrated in FIG. 5, corresponds to the upper side, illustrated in FIG. 3, and therefore the temperature-control fluid in FIG. 5 can flow from the right to the left.

The subunits 1 of the battery module 2 are pushed into the housing 19 of the battery module 2 from the right to the left according to FIG. 5. The housing 19 of the battery module 2 can have receptacles 26 here for the subunits 1.

The housing 19 of the battery module 2 in particular has first receptacles 261 here for receiving subunits 1, in which the first receiving space 7 is arranged directly adjacent to the respective receptacle 26.

The housing 19 of the battery module 2 in particular has second receptacles 262 here for receiving subunits 1, in which the second receiving space 8 is arranged directly adjacent to the respective receptacle 26.

In particular, the battery cell stack 5 or the battery cell 6 has at least one voltage tap 27 which is electrically in contact with the first receptacle 262 such that a voltage of the battery cell stack 5 or of the battery cell 6 can be tapped via the first receptacle 26. Furthermore, the battery cell stack 5 or the battery cell 6 can have at least one voltage tap 28 which is guided through the first receptacle 261 and is therefore made contact with from surroundings 29 of the battery module 2.

The invention claimed is:

1. A subunit of a battery module (2), comprising
a first receiving element (3) and a second receiving element (4) which are connected to each other, forming at least one first receiving space (7) and at least one second receiving space (8), the at least one first receiving space (7) being defined by both the first receiving element (3) and the second receiving element (4), and the at least one second receiving space (8) being defined by both the first receiving element (3) and the second receiving element (4),
wherein the first receiving space (7) and the second receiving space (8) are separated from each other, and at least one battery cell stack (5) or at least one battery cell (6) is arranged in the first receiving space (7), and the second receiving space (8) is configured for receiving a temperature-control fluid (9),
wherein the first receiving element (3) is a separate piece from the second receiving element (4), and
wherein the first receiving element (3) is fixed to the second receiving element (4).

2. The subunit of a battery module according to the preceding claim 1, characterized in that a compensating element (10) configured to be elastically and/or plastically deformable is furthermore arranged in the first receiving space (7).

3. The subunit of a battery module according to claim 1, characterized in that the first receiving element (3) and the second receiving element (4) are connected to each other in an integrally bonded manner.

4. The subunit of a battery module according to claim 1, characterized in that the first receiving space (7) furthermore has an insulating element (11) which is configured to be electrically insulating and which at least partially surrounds the at least one battery cell stack (5) or the at least one battery cell (6).

5. The subunit of a battery module according to claim 1, further comprising a second first receiving space (7), in which at least one battery cell stack (5) or at least one battery cell (6) is arranged, and a second receiving space (8) configured for receiving a temperature-control fluid (9).

6. The subunit of a battery module according to the preceding claim 5, characterized in that the first receiving spaces (7) and the second receiving spaces (8) are arranged in an alternating manner in a longitudinal direction (12) of the subunit (1).

7. A battery module comprising first and second subunits (16, 17) according to claim 1.

8. The battery module according to claim 7, wherein a first first section (161) of the first receiving element (31) is arranged directly adjacent to a second second section (172) of the second receiving element (42), wherein the first first section bounds a first receiving space (71) of the first subunit (16) and the second second section bounds a second receiving space (82) of the second subunit (17).

9. The battery module according to claim 8, wherein a second first section (171) of the second receiving element (42) is arranged directly adjacent to a first second section (162) of the first receiving element (31), wherein the second first section bounds a first receiving space (72) of the second subunit (17) and the first second section bounds a second receiving space (81) of the first subunit (16).

10. The battery module according to claim 7, wherein a second first section (171) of the second receiving element (42) is arranged directly adjacent to a first second section (162) of the first receiving element (31), wherein the second first section bounds a first receiving space (72) of the second subunit (17) and the first second section bounds a second receiving space (81) of the first subunit (16).

11. The battery module according to claim 8, characterized in that a compensating element (18) which is configured to be elastically and/or plastically deformable is arranged between the first first section (161) and the second second section (172).

12. The battery module according to claim 10, characterized in that a compensating element (18) which is configured to be elastically and/or plastically deformable is arranged between the second first section (171) and the first second section (162).

13. The battery module according to claim 7, characterized in that the battery module (2) is accommodated in a housing (19) which comprises a first connection (20) configured for admitting temperature-control fluid (9) into at least one second receiving space (8), and which comprises a second connection (21) configured for letting temperature-control fluid (9) out of at least one second receiving space (8).

14. The battery module according to claim 7, characterized in that the battery module (2) is accommodated in a housing (19), wherein a control and/or regulating device (23) is arranged between a second receiving space (83) of a subunit (113) of the battery module (2) and a housing wall (25) of the battery module (2).

15. The battery module according to claim 14, characterized in that the battery module (2) is accommodated in a housing (19), wherein an electric connecting line (24) is arranged between a second receiving space (83) of a subunit (113) of the battery module (2) and a housing wall (25) of the battery module (2).

16. The battery module according to claim 7, characterized in that the battery module (2) is accommodated in a housing (19), wherein an electric connecting line (24) is arranged between a second receiving space (83) of a subunit (113) of the battery module (2) and a housing wall (25) of the battery module (2).

17. The subunit of a battery module according to claim 1, characterized in that the first receiving element (3) and the second receiving element (4) are connected to each other in a welded manner.

18. A method for producing a subunit (1) of a battery module (2), wherein, in a first method step, a first receiving element (3) and a second receiving element (4) are provided, and, in a second method step, at least one battery cell stack (5) or at least one battery cell (6) is arranged between the first receiving element (3) and the second receiving element (4), and, in a third method step, the first receiving element (3) and the second receiving element (4) are connected to each other in such a manner that a first receiving space (7) is formed, in which the at least one battery cell stack (5) or the at least one battery cell (6) is accommodated, and a second receiving space (8) is formed, which is configured for receiving a temperature-control fluid (9), wherein the first receiving space (7) and the second receiving space (8) are separated from each other.

19. A battery module comprising first and second subunits (16, 17), the first and second subunits each comprising
a first receiving element (3) and a second receiving element (4) which are connected to each other, forming at least one first receiving space (7) and at least one second receiving space (8), wherein the first receiving space (7) and the second receiving space (8) are separated from each other, and at least one battery cell stack (5) or at least one battery cell (6) is arranged in the first receiving space (7), and the second receiving space (8) is configured for receiving a temperature-control fluid (9),
wherein a first first section (161) of the first receiving element (31) is arranged directly adjacent to a second second section (172) of the second receiving element (42), wherein the first first section bounds the first receiving space (71) of the first subunit (16) and the second second section bounds the second receiving space (82) of the second subunit (17).

20. The battery module according to claim 19, wherein a second first section (171) of the second receiving element (42) is arranged directly adjacent to a first second section (162) of the first receiving element (31), wherein the second first section bounds a first receiving space (72) of the second subunit (17) and the first second section bounds a second receiving space (81) of the first subunit (16).

21. The subunit of a battery module according to claim 1, wherein the first receiving element (3) and the second receiving element (4) have respective first portions that are spaced apart and that define therebetween the first receiving space (7), wherein the first receiving element (3) and the second receiving element (4) have respective second portions that are spaced apart and that define therebetween the second receiving space (8), and wherein the first receiving element (3) and the second receiving element (4) have respective third portions that are between the first portions and the second portions and that are connected so that the first receiving space (7) and the second receiving space (8) are separated from each other.

* * * * *